United States Patent
Reed

(10) Patent No.: US 12,423,663 B1
(45) Date of Patent: Sep. 23, 2025

(54) PAYMENT HOLDING AND DISBURSEMENT METHOD

(71) Applicant: Rachel Reed, Fort Ann, NY (US)

(72) Inventor: Rachel Reed, Fort Ann, NY (US)

( * ) Notice: Subject to any disclaimer, the term of this patent is extended or adjusted under 35 U.S.C. 154(b) by 252 days.

(21) Appl. No.: 18/354,429

(22) Filed: Jul. 18, 2023

Related U.S. Application Data

(63) Continuation-in-part of application No. 16/729,364, filed on Dec. 28, 2019, now abandoned.

(60) Provisional application No. 62/786,291, filed on Dec. 28, 2018.

(51) Int. Cl.
*G06Q 40/00* (2023.01)
*G06Q 20/10* (2012.01)

(52) U.S. Cl.
CPC .................. *G06Q 20/108* (2013.01)

(58) Field of Classification Search
CPC .................................. G06Q 20/108
See application file for complete search history.

(56) References Cited

U.S. PATENT DOCUMENTS

| | | | | |
|---|---|---|---|---|
| 6,484,153 B1* | 11/2002 | Walker | ................. | G06Q 50/188 705/317 |
| 8,280,788 B2* | 10/2012 | Perlman | ................ | G06Q 20/405 705/40 |
| 9,881,131 B1* | 1/2018 | Dickelman | ............ | G06Q 20/10 |
| 10,565,586 B2* | 2/2020 | Roche | .................. | G06Q 20/02 |
| 10,579,999 B2* | 3/2020 | Subbarayan | ........ | G06Q 20/401 |
| 2002/0004780 A1* | 1/2002 | Mizuta | .................. | G06Q 40/02 705/26.1 |
| 2003/0139999 A1* | 7/2003 | Rowe | .................... | G06Q 20/108 705/42 |
| 2008/0162295 A1* | 7/2008 | Bedier | .................. | G06Q 20/04 705/26.1 |
| 2009/0327099 A1* | 12/2009 | Patel | .................. | G06Q 30/0613 705/26.1 |
| 2010/0312700 A1* | 12/2010 | Coulter | .................. | G06Q 40/02 705/42 |
| 2012/0284147 A1* | 11/2012 | Nie | ........................ | G06Q 30/06 705/26.41 |
| 2015/0052045 A1* | 2/2015 | De Luca | .............. | G06Q 20/354 705/39 |
| 2019/0057373 A1* | 2/2019 | Van Veelen | ............ | G06Q 20/00 |

OTHER PUBLICATIONS

A Fair Transaction Mechanism for P2P File-Sharing Applications; 2009 6th IEEE Consumer Communications and Networking Conference (2009, pp. 1-5); Dongsheng Peng, Weidong Liu, Chuang Lin, Zhen Chen; Jan. 10, 2009. (Year: 2009).*

* cited by examiner

*Primary Examiner* — Tien C Nguyen
(74) *Attorney, Agent, or Firm* — INNOVATION CAPITAL LAW GROUP, LLP; Vic Lin

(57) ABSTRACT

A method guarantees funds from a buyer to a seller in conjunction with systematic or manual disbursement of funds. The buyer may transfer funds from a funding source into a holding account which may be locked to prohibit funds from being removed by the buyer. This guarantees fund availability to the seller. The seller may be allowed to view funds in the holding account or may be notified that the amount meets the agreement amount established between the buyer and seller based on the criteria of the product or service being rendered. Disbursement methods can be established via mutual agreement for the release of fund from a locked account of the buyer to the seller.

19 Claims, 10 Drawing Sheets

PAYMENT HOLDING AND DISBURSEMENT METHOD

CROSS-REFERENCE TO RELATED APPLICATIONS

This application is a continuation-in-part of U.S. patent application Ser. No. 16/729,364, filed Dec. 28, 2019, which claims the benefit of U.S. provisional patent application No. 62/786,291, filed on Dec. 28, 2018, the contents of each of which are herein incorporated by reference.

BACKGROUND OF THE INVENTION

1. Field of the Invention

The present invention relates generally to financial transactions and more specifically to facilitating network-based financial transactions involving a method for holding, locking and distributing funds with respect to selected handling and disbursement parameters, allowing viewing access to interested parties, and distributing funds with respect to buyer/seller agreements, particularly those methods determined and controlled by an individual.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

In an economic environment where network-based payment processing is standard for both commercial and personal use, the need for heightened security is inarguable. Well-established internally regulated methods for online transaction security and convenient processing have become industry standards, increasing user confidence and satisfaction. However, externally controlled methods in the hands of the individual to safeguard funds are left unresolved.

The payment holding and disbursement method addresses the need for a process to safeguard the handling and disbursement of funds in commerce relationships, as seen in one embodiment, through third-party network-based technology. Currently, in a buyer-seller transaction, both parties are vulnerable to fraudulent practices with limited means of financial protection. The payment holding and disbursement method, when coupled with a network-based payment system, for example, may function to keep funds secure by inhibiting payment to a seller prior to service completion or product delivery without disintegrating the seller's confidence in receiving payment. This method would prevent fund withdrawal by the buyer securing funds in a holding account. In addition, the payment disbursement method of the invention may serve to systematically release funds efficiently to sellers, promoting effective and safe commerce practices for both sides of the transaction. Applied to a network-based payment application, for example, this method may yield a digital transaction diary as an ancillary benefit.

An example of one company utilizing network-based commerce is eBay Inc. eBay Inc. utilizes a method for the transfer of funds between two parties and acts as a third-party holding account and communication network. This system allows for funds to be obtained between parties in a few simple steps. The holding portion of this system allows funds to be held in escrow or a holding account for an unlimited number of days. The funds may be transferred to a financial institution or rendered as payment at any given time, provided there is fund availability in the eBay account. eBay Inc. uses internal mechanisms to relinquish payment from buyer to seller based on risk assessments. While this system has served as a means of avoiding fraudulent activity in certain buyer-seller situations, it is heavily based on risk assessments, internal controls, and transactions generated through network systems. These internal mechanisms are useful in eBay transactions, however in circumstances where the buyer is engaging with a seller from a place of vulnerability, either in person-to-person contact or through a network medium, there need for external controls that will safeguard their assets remains unresolved.

Person-to-person and online commerce relationships have a history of misuse by individuals seeking fraudulent gain. This challenge creates a market climate that reduces user confidence, thereby hindering market growth. Several areas of the financial market are presently beyond the era of hand-to-hand commerce transactions yet still require the same authenticity of rendering and receiving funds personally. In this place of vulnerability, financial transactions require specific measures to safeguard buyers and sellers from fraudulent transactions while also preventing misuse.

Currently in the financial market there are tangible payment bonds which allow for monies to be held and guaranteed in paper form. While these have been useful in the past, the process for retrieving these bonds is systematically flawed, requiring excessive time and procedures. These bonds are not frequently used in the marketplace and therefore only serve the minority of individuals who would assume the efforts in order to safeguard large financial stakes. In addition, these forms of payment are less common, so those with minimal exposure may not trust their use. In scenarios where payment guarantee is necessary a method is required to streamline transactions of any size through network-based third party management. The other significant differences between paper and network-based payment methods include—user-to-user viewing of account, simplicity of transferring funds, and no paper handling. In addition, if a buyer is paying multiple sellers for a project or service, the buyer may be required to procure multiple bonds, which would require increased handling efforts and organization. In addition, if the seller were to increase the amount owed due to any number of reasons, the buyer would have to either re-issue a new bond or purchase a second bond. Based on the payment holding and disbursement method, the buyer could, for example, simply increase the fund amount in the payment holding portion of the method for a particular seller with ease and minimal time.

SUMMARY OF THE INVENTION

According to one embodiment, in a buyer-seller relationship, the need to harness network-based or other technologies that are capable of utilizing methods which assist commerce transactions pertaining to individualized handling is necessary. The details of how the payment holding and disbursement method encourages the safeguarding of funds and establishes a systematic method for fund release based on conditions outlined in a buyer-seller agreement, for example, are unique to this invention. A buyer-seller agreement relates to any transaction, spoken, written, or implied, between parties, referred to here as buyer and seller.

Utilization of this method may allow buyers to guarantee payment for products or services by securing funds in a holding account which may be locked and made visible to the seller(s). A locked account may prevent the buyer from extracting funds from the account until either a buyer-seller agreement is satisfied or dissolved. Viewing access may permit the buyer to confirm with the seller that funds are available. Satisfaction of the agreement might require the meeting of established or implied expectations. Dissolution of agreement might result in an exit from the buyer-seller relationship.

The disbursement method of funds may be based on a pre-established agreement between buyer and seller. The options may allow a buyer and seller to establish a protocol for payment for a product or service.

Payment disbursement methods shall improve user confidence for both the buyer and the seller as funds are rendered manually or systematically from a buyer account, for example, to a seller account. At the point of reaching a buyer-seller agreement, a payment holding account may be locked and therefore safeguarded from withdrawal prior to completion of a service or product(s) being rendered. A buyer-seller agreement may be any method of establishing expectations that a seller must satisfy in order to receive payment for product(s) or service(s). Expectations in the buy-seller agreement may be, but are not limited to, amount requested by seller for product or service, service or product description, time frame for services rendered to be completed or product to be delivered, and payment distribution details.

For example, a scenario may arise in which a service or product might require a structured time frame or development process. For the purposes of protecting the buyer, this method discourages full payment to a seller prior to satisfactory completion of the product or service. In addition, since payment is not provided in full to the seller at the start of the product or service, for purposes of protecting the seller, payment may be held in a locked account to ensure payment to the seller upon satisfactory completion of the product or service.

Reasons for applying the payment holding and disbursement methods to fund transfers between a buyer and seller(s) is to prevent dishonest practices by both parties. Buyer-seller relationships have been abused by fraudulent activity and miscommunicated expectations throughout history, thus creating distrust in the commerce setting. A negative experience may lead to distrust in future transactions for either party involved or potential avoidance of similar dealings all together. Distrust in people should not overwhelm a buyer or seller to avoid commerce in general. Instead, people must know they are protected and should be affirmed in such transactions to encourage present and future transactions. The locking of funds in a holding account empowers both buyers and sellers to pursue commerce relationships with confidence and optimism. The use of disbursement methods allows for the systematic payments from buyer to seller to be established at the beginning of the buyer-seller relationship.

Examples of buyer-seller scenarios that may justify use of this invention are as follows but are not limited to the below examples.

To protect a buyer, seeking a service or product, from being defrauded of funds by being misled by a seller. Based on a written, spoken, or implied agreement pertaining to the transaction, the service or product which was agreed upon may not have been completed, delivered, or was improperly done by the seller. In this scenario, the buyer is not satisfied by the results, yet all or a portion of funds may be lost if monies were given "in good faith" prior to the seller satisfying the written or spoken agreement.

Another scenario exists where a seller, who has satisfactorily completed a service or product agreement, is not justly compensated and thereby defrauded by the buyer, who had sought out the service or product and agreed to payment based on a written or implied arrangement. In this situation, the seller has lost out on profit, time, and possibly product whilst also having potentially limited means to recuperate the loss.

In either scenario, the individual or company facing the loss may then desire to seek retribution through legal means which may demand excessive amounts of time and resources. In both situations, the adverse outcome may have been averted if a method was in place to set funds aside as an act of good faith where neither party could obtain funds until pre-established agreements are satisfied. As another measure of security and convenience, a systematic form of disbursement of funds may resolve the dilemma of total or partial loss of monies. A secondary benefit of this system exists in the digital trail it creates in establishing buyer-seller agreements and terms for product or service expectations as well as tracking payments that have been transferred. These forms of documentation may provide legitimate evidence and assistance in any legal claims by either party.

Additional benefits in the present invention stem from the guaranteed payment portion of the invention as seen in the locked account. The method of locking funds in a third-party holding account, a seller can be assured that payment is available and "waiting". This may motivate seller(s) to complete agreement requirements and thereby accelerate results.

The method of disbursing payment allows for multiple payments to be made having been established ahead of time based on buyer-seller agreements which inherently offers protection to both buyers and sellers and is another layer of security relating to money handling. In many situations where payment is in the form of cash or check, handling such transactions is to the disadvantage of the buyer if the seller does not continue to satisfy agreement requirements and does not return undeserved funds. Coupled with any technology that may utilize the payment holding and disbursement methods invention, will effectively deter disreputable individuals seeking to acquire funds, services, or products without satisfying their portion of the buyer-seller agreement from engaging in fraudulent activity.

With the payment holding and disbursement method, both parties may participate in a contractual agreement whilst funds are protected until those agreements are satisfied. The payment holding accounts allow safeguarding of funds and the payment disbursement method establishes a systematic method for payment based on established parameters which should satisfy both parties while protecting both buyer and seller (this applies to any transfer of commerce or barter between parties using this method).

An example of a situation implementing the payment disbursement method is one in which a buyer contracts an independent contractor to remodel a home bathroom. The seller, who in this scenario is an independent contractor, may enter into agreement with the buyer to outline time frame and expectations for the work that will be done by the seller. In this scenario, the seller may agree to a payment disbursement option. When the seller agrees to a payment option, for example, the seller may immediately see the funds locked in the holding account. He may begin work by removing all pre-existing bathroom components thereby satisfying one portion of the agreement expectations and thereby meeting the requirement for the allocated fund amount for the specific action to be released to the seller account. This process would continue as agreement objections are satisfied until all agreement expectations are met and the total amount of funds agreed to the seller is disbursed. A buyer-seller agreement may be outlined in the holding account parameters thereby establishing objectives and expectations between the buyer and seller. This situation is an example of one possible buyer-seller relationship in which the payment holding and disbursement methods may be implemented collectively.

In an economic environment where the number of commerce transactions is increasing daily, these methods coupled with the appropriate technology serve as tools for any individual engaging in commerce that are not only helpful but crucial for payment processing. Individuals who seek to improve the overall method of payment processing may use this system to streamline payments, thus garnering a professional yet personal appeal to those in a multitude of commerce settings.

Embodiments of the present invention provide a computer-implemented method for facilitating a transaction between a buyer and a seller comprising displaying a dashboard to the buyer in a buyer graphical user interface on a buyer computing device, the dashboard including a plurality of options providing for a selection and management of a central account of the buyer; creating a holding account associated with the central account, the holding account enabling the buyer to place funds therein from the central account; linking the holding account to the seller for which the buyer is making the transaction; providing a buyer viewing status identifier on the buyer graphical user interface, wherein turning on the viewing status identifier, by the buyer, permits the seller to view a presence of a holding account linking the buyer and the seller on a seller graphical user interface, the buyer viewing status identifier displaying with a first unique identification; permitting the seller to access a seller viewing status identifier on the seller graphical user interface for the holding account, the seller viewing status identifier initially appearing in an off position with the first unique identification, wherein turning on the seller viewing status identifier changes the first unique identification to a second unique identification on both the seller viewing status identifier and the buyer viewing status identifier for the holding account; and permitting the buyer to accept a seller viewing status, wherein, upon acceptance, the second unique identification changes to a third unique identification on the buyer graphical user interface and on the seller graphical user interface, and a viewing status of the holding account is locked.

Embodiments of the present invention provide a computer-implemented method for facilitating a transaction between a buyer and a seller comprising displaying a dashboard to the buyer in a buyer graphical user interface on a buyer computing device, the dashboard including a plurality of options providing for a selection and management of a central account of the buyer; creating a holding account associated with the central account, the holding account enabling the buyer to place funds therein from the central account; linking the holding account to the seller for which the buyer is making the transaction; providing a buyer locking status identifier on the buyer graphical user interface, wherein turning on the locking status identifier, by the displays the buyer locking status identifier with a first unique lock identification once turned on by the buyer; permitting the seller, once turned on by the buyer, access to a seller locking status identifier on the seller graphical user interface for the holding account, the seller locking status identifier initially appearing in an off position with the first unique lock identification, wherein turning on the seller locking status identifier changes the first unique lock identification to a second unique lock identification on both the seller locking status identifier and the buyer locking status identifier for the holding account; and permitting the buyer to accept a seller locking status, wherein, upon acceptance, the second unique lock identification changes to a third unique lock identification on the buyer graphical user interface and on the seller graphical user interface, and an account balance in the holding account is locked.

Embodiments of the present invention provide a computer-implemented method for facilitating a transaction between a buyer and a seller, comprising displaying a dashboard to the buyer in a buyer graphical user interface on a buyer computing device, the dashboard including a plurality of options providing for a selection and management of a central account of the buyer; creating a holding account associated with the central account, the holding account enabling the buyer to place funds therein from the central account; linking the holding account to the seller for which the buyer is making the transaction; providing a buyer viewing status identifier on the buyer graphical user interface, wherein turning on the viewing status identifier, by the buyer, permits the seller to view a presence of a holding account linking the buyer and the seller on a seller graphical user interface, the buyer viewing status identifier displaying with a first unique identification; permitting the seller to access a seller viewing status identifier on the seller graphical user interface for the holding account, the seller viewing status identifier initially appearing in an off position with the first unique identification, wherein turning on the seller viewing status identifier changes the first unique identification to a second unique identification on both the seller viewing status identifier and the buyer viewing status identifier for the holding account; permitting the buyer to accept a seller viewing status, wherein, upon acceptance, the second unique identification changes to a third unique identification on the buyer graphical user interface and on the seller graphical user interface, and a viewing status of the holding account is locked; providing a buyer locking status identifier on the buyer graphical user interface, wherein turning on the locking status identifier, by the displays the buyer locking status identifier with a first unique lock identification once turned on by the buyer; permitting the seller, once turned on by the buyer, access to a seller locking status identifier on the seller graphical user interface for the holding account, the seller locking status identifier initially appearing in an off position with the first unique lock identification, wherein turning on the seller locking status identifier changes the first unique lock identification to a second unique lock identification on both the seller locking status identifier and the buyer locking status identifier for the holding account; permitting the buyer to accept a seller locking status, wherein, upon acceptance, the second unique lock identification changes to a third unique lock identification on the buyer graphical user interface and on the seller graphical user interface, and an account balance in the holding account is locked; and enabling, based on one or more disbursement parameters, a predefined amount of funds in the holding account to be transferred from the holding account to an account of the seller.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figure 1:
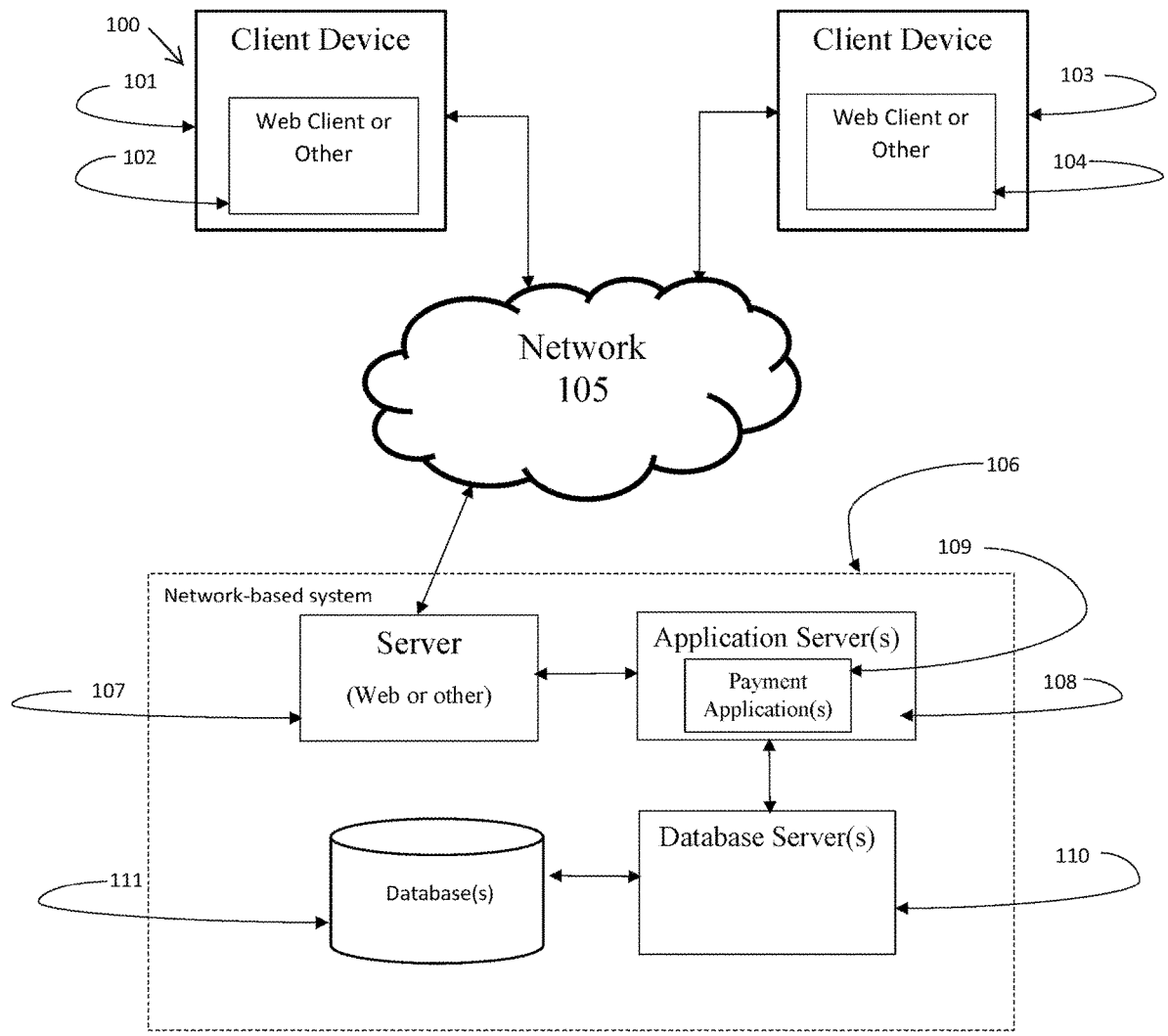
FIG. 1 illustrates a network system, according to an example embodiment of the present invention, having a client-server model.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide a method for guaranteeing funds from a buyer to a seller in conjunction with systematic or manual disbursement of funds as buyer-seller agreements are satisfied. The buyer may transfer funds from a funding source into a holding account which may be locked to prohibit funds from being removed by the buyer. This guarantees fund availability to the seller. The seller may be allowed to view funds in the holding account or may be notified that the amount meets the agreement amount established between the buyer and seller based on the criteria of the product or service being rendered. The buyer is offered the option to select how payment will be made to the seller. These options protect the buyer from relinquishing funds prior to the seller satisfying requirements established between the buyer and seller while systematically compensating the seller at appropriate times or stages in the parameters of the agreement. If the agreement reaches full completion, then the full amount which both parties agreed to will be transferred to the seller's account. If the agreement is not fully satisfied the remaining amount may be returned to the buyer.

The payment holding and disbursement methods of this invention may be launched in a payment application coupled with a network system but method implementation should not be limited to these technologies. This invention is structured to be accessible whenever and wherever commerce is achievable. Various aspects of the system are customizable per user/buyer/seller or client specification.

In the following description, for the purpose of explanation, a multitude of specific details are discussed in order to establish a thorough understanding of the embodiments of the present invention.

Embodiments of the present invention illustrate a method to systematically distribute payment to a seller via a network-based payment platform. The method includes establishing a secure user holding account(s) which may be locked in order to prevent fund withdrawal and thus guarantee payment. In addition, sellers may be able to view holding account status for proof of funds. Buyer and seller may implement a systematic disbursement of funds from the locked holding account thereby releasing funds from the buyer to the seller.

Embodiments of the present disclosure enable a buyer to place funds in a holding account with, for example, an online payment provider which by choice may be locked to inhibit withdrawal. Upon acquiring an agreement with a seller in which the agreement guarantees payment via locked holding account, the funds may not be withdrawn until the agreement is satisfied or dissolved. Furthermore, example embodiments herein convey payment disbursement—which may be customizable based on buyer-seller agreement conditions.

FIG. 1 represents, in an example embodiment of the present invention, a network diagram 100 illustrating a system having a client-server architecture which includes client device(s) 101,103, client 102,104, and a network-based system 106 connected via a network 105. Statues of this invention are not intended to be limited by means of this architecture and should be seen as examples of how this invention may be utilized.

The network 105 may, for example, be the Internet, telephone system, or any other technology linking the client(s) 102,104 and the network-based system 106. The network 105 access should result in communication between client and payment application(s) 109 with respect to database server(s) 110 and database(s) 111.

The client device may, for example, include any machine or system that gains access to the network-based system 106 such as a personal electronic device, tablet, cellular phone, laptop computer, desktop computer, or land-line telephone, for example.

FIG. 1 also illustrates that the client may, for example, be any web browser or network-accessing system that might operate on the client device 101,103.

The client 102, 104 may utilize network servers 107 to gain access to the application server 109. Payment applications 111 stored in a network database 110 may be accessed via database server(s) 109. Elements 107, 108, 109, 110, and 111 are part of a Network-based System 106. Users 102,104 are presented here as a buyer and a seller as a means of representing a transaction between two parties where funds are transferred from one person to another. The buyer-seller relationship and terminology should not limit the invention as it is intended for any transaction between users.

While the system 100 in FIG. 1 utilizes a client-server architecture, embodiments are not limited to such architecture, and utilization may apply to a multitude of other systems that exist currently or that may be developed.

The payment application(s) 109 may have access to the database 111 through, for example, the database server(s) 110. Database server(s) 110 may support one or more user accounts on device application 101, 103.

Payment application(s) 109 may be structured to accommodate multiple transactions to multiple sellers per each user account. Payment application(s) 109 may allow, for example, central account(s) with an unlimited number of holding accounts. These holding accounts may be connected with a seller's user account and thereby provide the conditions for a buyer-seller commerce transaction. Such conditions are not required but may be available. The payment application(s) 109 may, for example, receive funds from an external funding source such as a financial institution, third-party payment platform, credit card, electronic check, or debit card or from within the payment application(s) 109. The types of funding listed here should not limit funding sources but merely be seen as examples.

Figure 2:
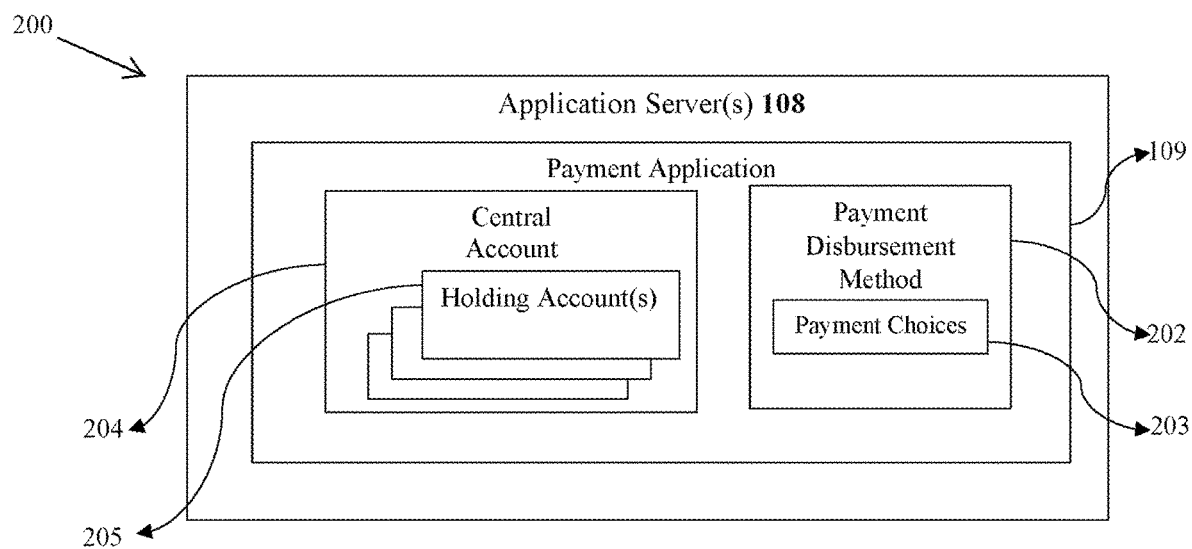
FIG. 2 illustrates a block diagram demonstrating an application server in an example embodiment of the present invention with the holding account and payment disbursement applications, respectively.

FIG. 2 represents, in an example embodiment, a block diagram 200 illustrating the application server 108 and payment application 109. Components of the payment application 109 include user account(s) 204 with respective holding account(s) 205 with respective and payment disbursement method 202.

The user may access the payment application 109 using, for example, the network system 100 and thereby gain access to the user account(s) 204 and payment disbursement method 202 and their respective components. The listing of network payment application 109 components is not intended to limit the number of elements, but rather to focus on and illustrate the functionality of the user account(s) 204 with respect to the holding account(s) 205.

The user account(s) 204 and respective holding account(s) 205 may be utilized as payment application methods whereby users might hold funds or commerce in a network payment application. The holding accounts 205 are distinct entities that may function under the user account(s) 204. Holding accounts 205 may be treated as independent accounts and thereby serve to designate funds to specific sellers. There is no limit to the number of holding accounts 205 that may be associated to each user account 204. In this way, the user account(s) 204 may retrieve any amount of funds from a funding source and allocate any specific amount of those funds up to the total amount in the user account 204 into specific holding accounts 205.

Users may not be limited to a single user account 204, this example embodiment is intended to depict the function of a user account 204 functioning in a network payment application with respective holding accounts 205. This is not intended to limit the current invention but to convey the systematic method of holding funds in a user account 204 and allocating a portion or all funds into the specified locked holding account(s) 205.

Also illustrated in FIG. 2 is the payment disbursement method 202. The payment disbursement method 202 may be utilized as the choice payment transfer method that may systematically or manually disburse payment between from buyer's holding account to seller's account.

Illustration of two methods, the central account 204 and payment disbursement 202, should not limit the number of functions that a payment application 109 is capable of utilizing.

Figure 3:
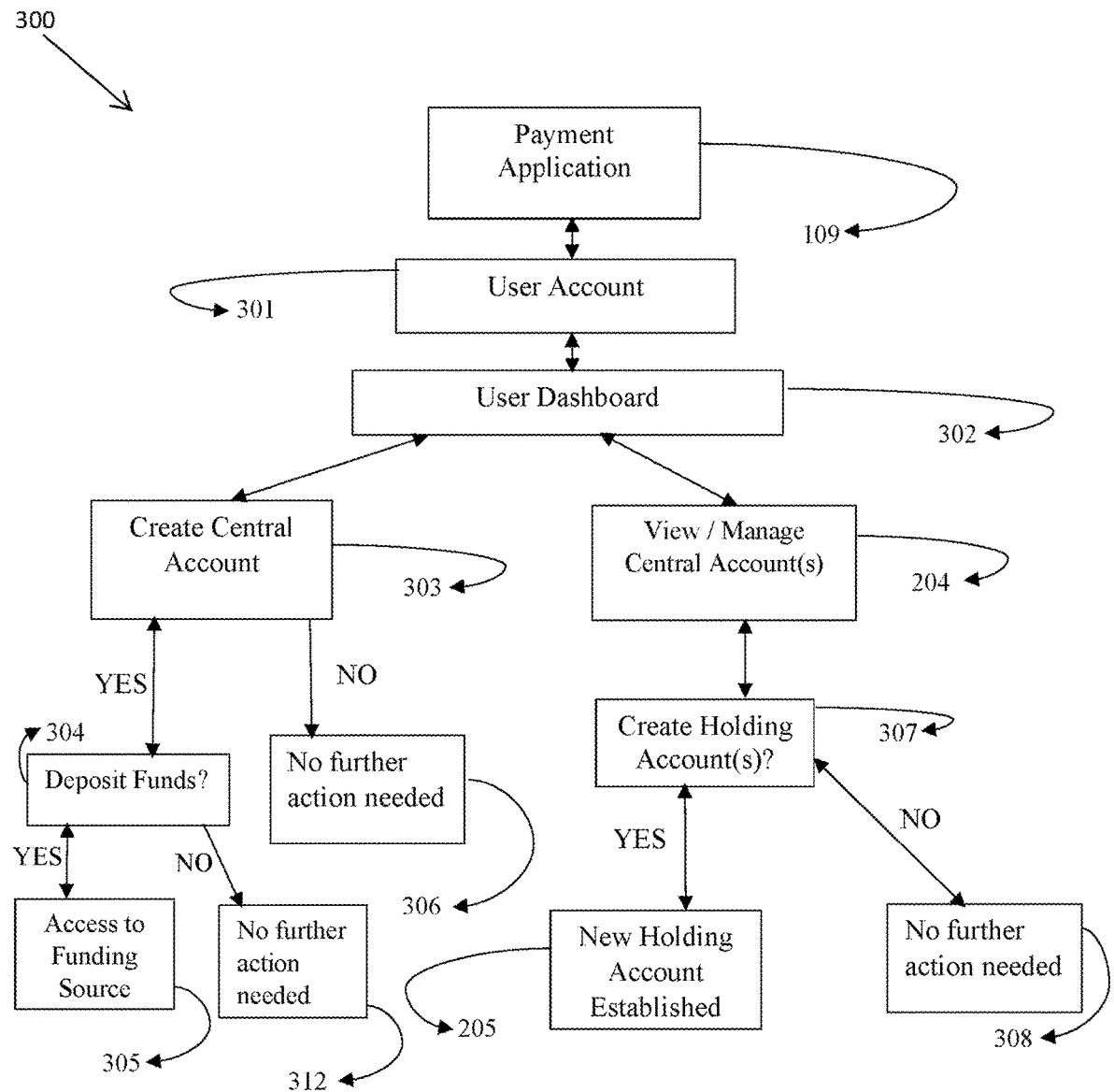
FIG. 3 illustrates, in an example embodiment, a flow diagram of a procedure for establishing the holding/user account(s)

FIG. 3 illustrates, in an example embodiment 300, a flow diagram of a procedure for establishing the user account(s) 204 and thus the holding account(s) 205. The user account 204 is a secure account whereby access is granted to the holding account(s) 204. A user account 204 is any unique method of access allowing the user to interact with the network payment application 109.

Once the user account 204 is established, the user may gain access to the holding account(s) 205 associated with the respective individual user account 204. The user 101 may set up a holding account 205 by engaging with an option panel referred to a user dashboard 302 which may offer selections such view/manage central account 204 and create a central account 303, for example. The user may choose to create a holding account 205. A user account may exist without a central holding account 306, and no further action is needed at that time.

Once established, the user, who may also be the buyer, may choose to deposit funds 304 into the holding account 204. Central accounts 204 may access funds from single or multiple funding sources 305 including but not limited to financial institutions, third-party payment, credit card, debit, electronic check, or other central accounts 204 or holding accounts 205. Access to funding source(s) describes any means of communication between a funding source and the payment application whereby the result is the transferring or moving of funds (or equally acceptable form of commerce) to the central account 204.

The user may also choose to associate certain central accounts 204 with specific or separate funding sources and would be able to do so with multiple central accounts 204. The term deposited should broadly indicate that funds have been moved from one funding source into a central account 204. The available fund amount in central account(s) 204 may be displayed for viewing purposes and convenience when the user account 301 is accessed. Funds may be in the form of any currency or credit that can function as a tool to exchange for goods or services within the payment application parameters or in conjunction with external payment applications. The user may decide not to transfer funds or to delay transferring at the time of creating the central account 204, in this case no further action is needed 312. Central accounts 204 may exist without a positive fund status or a zero balance.

FIG. 3 also illustrates holding accounts 205 which may be utilized to enhance the actions of the central account(s) 204 by organizing funds and transactions into smaller accessible bundles, by way of multiple holding accounts 205, thereby allowing easier management of funds when conducting commerce with multiple sellers or for multiple services or products, for example. The user may navigate options within or associated with a central account 204 that allow the user to create a holding account 205. Should the user choose to create a new holding account 307, the holding account 205 will then be associated with the central account 204 under which it was established. There may be no limit to the number of times that a user may choose the option to create a holding account 205. The user may choose not to create a holding account in which case no further action in required 308 at that time.

Figure 4:
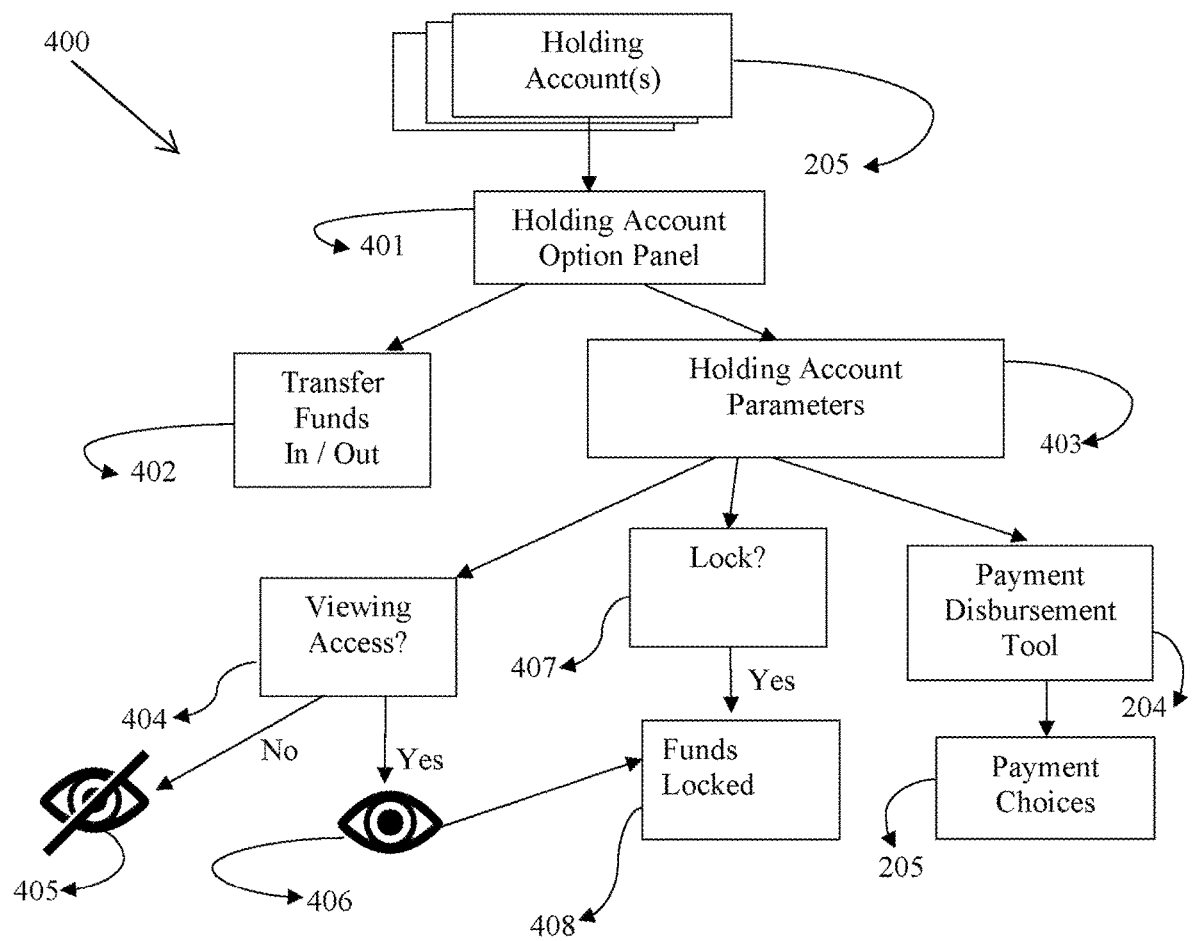
FIG. 4 illustrates, in an example embodiment, a flow diagram of a procedure for accessing established holding account(s), determining parameters for viewing access, locking the holding account, and initiating the payment disbursement agreements.

FIG. 4 illustrates, in an example embodiment, a flow diagram 400 of a method for accessing established holding account(s) and determining parameters for viewing access 404, locking 407, and initiating payment disbursement 204. User may access holding account(s) 205 by way of an associated central account 204, however this is one mode of access and is not intended to limit the invention or the methods of accessing holding account(s) 205.

Access to the holding account(s) 205 may provide the user a selection panel 401 or range of options to manage or further establish the holding account including, but not limited to, the option to transfer funds 402 into a selected holding account 205 and to establish parameters for the holding account 403. The transfer of funds may be sourced from the central account 204 associated with the selected holding account, however this is not intended to limit the invention, and funding source should not be restricted to the central holding account 204. Funds may be deposited into the holding account 205 directly from an external funding source or other third-party payment application, thus allowing the holding account(s) 205 access to funding source(s) 420 independently from the central account 204.

Holding accounts 205 may access funds from single or multiple funding sources 305 including but not limited to financial institutions, third-party payment applications, credit card, debit, electronic check, or central account 204. Access to funding source(s) describes any means of transmission between a funding source and the payment application whereby the result is the transferring or moving of funds or equally acceptable form of commerce to the holding account 205.

The user may also choose to associate certain holding accounts 205 with specific or separate funding sources and would be able to do so with multiple holding accounts 205. The term deposited should broadly indicate that funds have been moved from one funding source into a holding account 205. The available fund amount in holding accounts 205 may be displayed for viewing purposes and convenience when the user account 301 is accessed. Funds may be in the form of any currency or credit that can function as a tool to exchange for goods or services within the payment application parameters or in conjunction with external payment applications. The user may decide not to transfer funds or to delay transferring at the time of creating the holding account 205, in this case no further action is needed. Holding accounts 205 may exist without a positive fund status or a zero balance.

In transferring funds 402, the user may decide to move funds out of the holding account 205 into the central account 204. Other transfer options 402 may be available related to the holding account 205 and should not be limited to the example embodiment, as it is intended to represent the flexibility and fluidity of transfer capabilities.

The term manage is intended to broadly describe any process or operation that will alter or affect the holding accounts relating to user controls.

FIG. 4 also illustrates the permissions granted that outline the parameters of the holding account 403 as related to viewing access 404 to the seller, locking 407, and payment disbursement 202. The holding account parameters 403 may be outlined in respect to a buyer-seller agreement, for example, which may be preset in the payment application or parameters may be by-passed. The function of the holding account parameters 403 is to establish clearly outlined expectations between the user and seller. These expectations will enhance payment disbursement 202 by providing objectives and expectations to be met. This method of establishing parameters may be by-passed by the user and is not required for granting permissions or managing holding account 205.

A component of the holding account 205 may be permitting viewing access 404 to the holding account 205. With viewing access, the user may verify fund availability to the seller. The user may have the option to allow viewing access 406 or not allow viewing access 405. The term to view is intended to describe having access to fund availability, including but not limited visually, audibly, or any other mode of communication to the seller for the selected holding account 205. Viewing access 406 will not affect security associated with the user account. Viewing capabilities will grant access to the seller to confirm that the buyer holding account 205 has the expected amount of funds available. The funds expected by the seller relates to any agreed upon amount established in buyer-seller communications.

A second element of managing a holding account 205 may be activation of a locking control 411. A locking control may be intended to prevent buyer from withdrawing funds from the holding account 205 until established objectives or expectations are satisfied or dissolved. Additional examples permitting the release of funds include, but are not limited to, partial release or no release until a dispute between buyer and seller is resolved. The buyer may decide not to lock the holding account 205, then no further action is needed 412. The method of locking a holding account 205 should be contained within the selected holding account 205 as locking preferences are specific to individual holding accounts. Locking of an individual holding account 205 should not alter the accessibility of other holding accounts or central account(s) 204. Buyer controls within the payment application 109 may allow locking of the central account(s) 204 independent of holding account(s) 205, however the relationship of locking between the central account 204 and holding accounts 205 should not be limited in any way.

If buyer selects to lock the holding account 205 after parameters are established 403 and the seller does not satisfy the objectives or expectation set forth or satisfies only a portion of the details, then the buyer may release a portion of the funds or withhold all funds. It may be up to the buyer and seller to resolve the dispute, should one exist, or the seller may depart from the transaction and the funds may automatically be released to the buyer and the holding account 205 may be unlocked.

Buyer may choose to maintain funds in an unlocked holding account 205. Locked simply means that the buyer cannot extract funds from the selected holding account 205 especially once an agreement with a seller has been set in the holding account parameters 403. Locking 405 is not a required parameter for the holding account 205 to be accessed for payment to be released to the seller. Buyer may choose to hold the bulk of their funds in a secure unlocked central account 204 or holding account 205 and transfer funds as needed to a locked holding account 205. Payment disbursement 202 may be made from either a locked or unlocked holding account 205 to the seller.

A third element of the holding account(s) 205 illustrated in FIG. 4 addresses payment disbursement 202. Access may be given to through payment disbursement 202 through the holding account 205, however there may be other methods for achieving access to payment disbursement including, but not limited to, access through the central account(s), payment application, application server, separate applications, directly through devices, or other process whereby payment disbursement method 202 may be utilized. Payment disbursement 202 may allow the buyer to select method(s) for fund disbursement 203.

Figure 5:
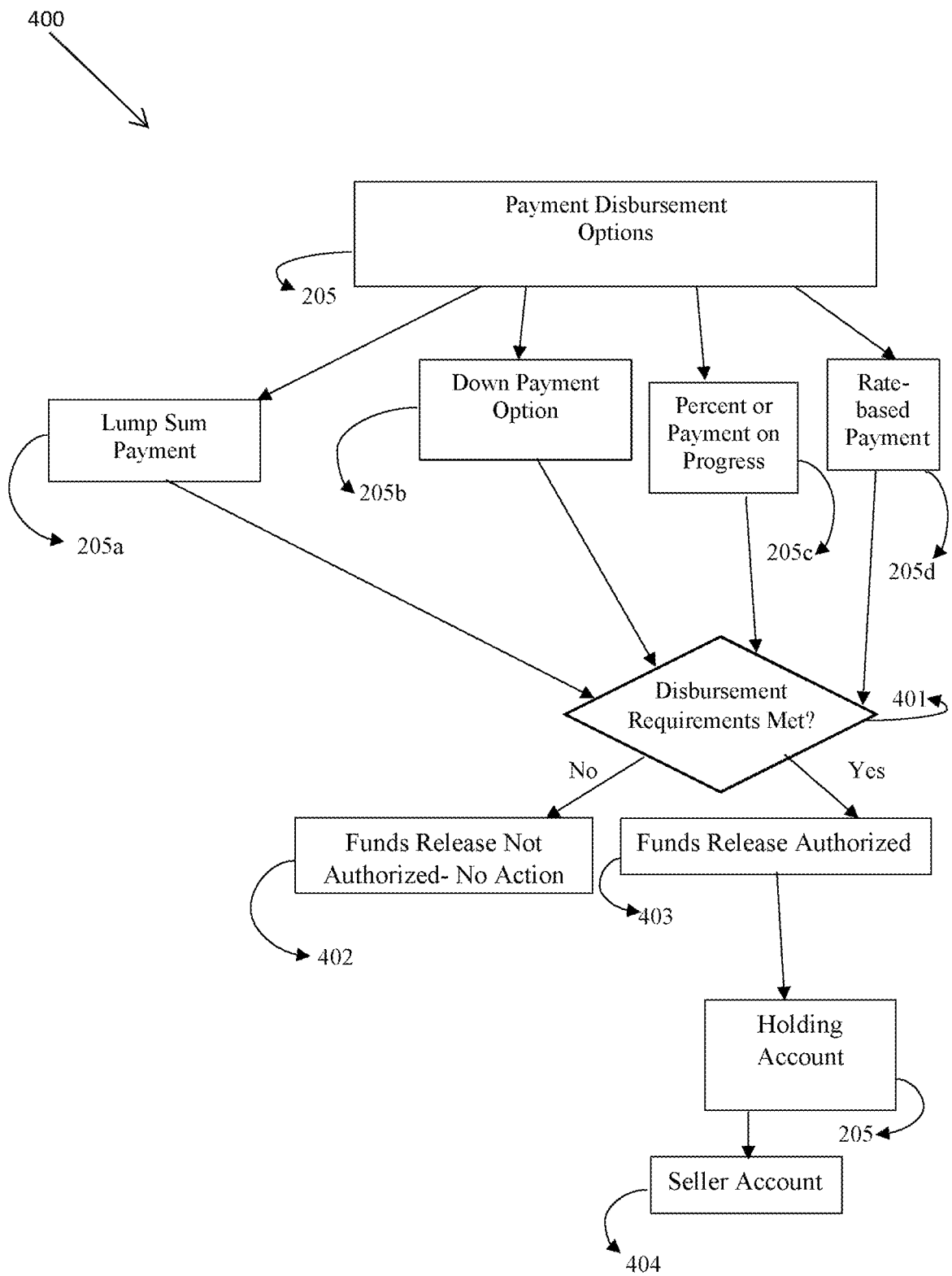
FIG. 5 illustrates, in an example embodiment, a flow diagram of a procedure for releasing payment from a selected locked holding account by way of a disbursement method following satisfaction of agreement requirements for fund release.

FIG. 5 illustrates, in an example embodiment 500, a flow diagram of a process for utilizing payment disbursement methods and options for fund release. Buyer may choose a payment disbursement option 205 for a selected holding account whereby they may disburse funds to a seller in a structured manner. Payment methods include, but are not limited to, the preference of payment in full 205a, down payment 205b, percent or payment on progress 205c, and hourly payment 205d. Payment disbursement methods 205 may occur, for example, at the discretion of the buyer or in established parameters 403 but are not limited to these factors.

The payment in full option 205a describes a method whereby the buyer may disburse funds to the seller in a single payment.

The down payment option 205b describes a method whereby the buyer may disburse funds to a seller as an initial payment of any amount followed by any number of payment installments over time.

The percent-based payment or payment on progress option 205c describes a method whereby the buyer may disburse funds to a seller in allotted amounts. Percent-based or payment on progress 205c disbursements may be based on seller performance or progress associated regarding a product or service, for example. Additionally, percent-based and payment on progress may be based on the ability of the seller to satisfy specific objectives related to product or service development or completion.

The rate-based payment option 205d describes a method whereby a buyer may disburse funds to a seller based on a fee structure. A rate-based payment method 205d may be established by the seller or agreed upon in the buyer-seller agreement, for example, and the factors influencing the rate-based method 205d might be adjusted to accommodate specific conditions. Rate-based payment 205d, for example, may be allotted daily, weekly, based on progress or hours worked. Combinations for a rate-based payment method 203d offer a flexible payment method for a variety of buyer-seller relationships.

Payment disbursement options 205 illustrated in FIG. 5 describe a method of systematically releasing funds or commerce based on controls the buyer may establish possibly with respect to seller feedback. Upon disbursement requirement being met 501, fund release is authorized 501, and the holding account 205 are transferred to the seller account 504. If disbursement requirements are not met, fund release is not authorized and no action occurs 502. The distinct relationship between payment disbursement 202 and the holding account 205 is the necessary requirements 501 being met by the seller in order for funds to be released or transferred into the seller account 504.

Figure 6:
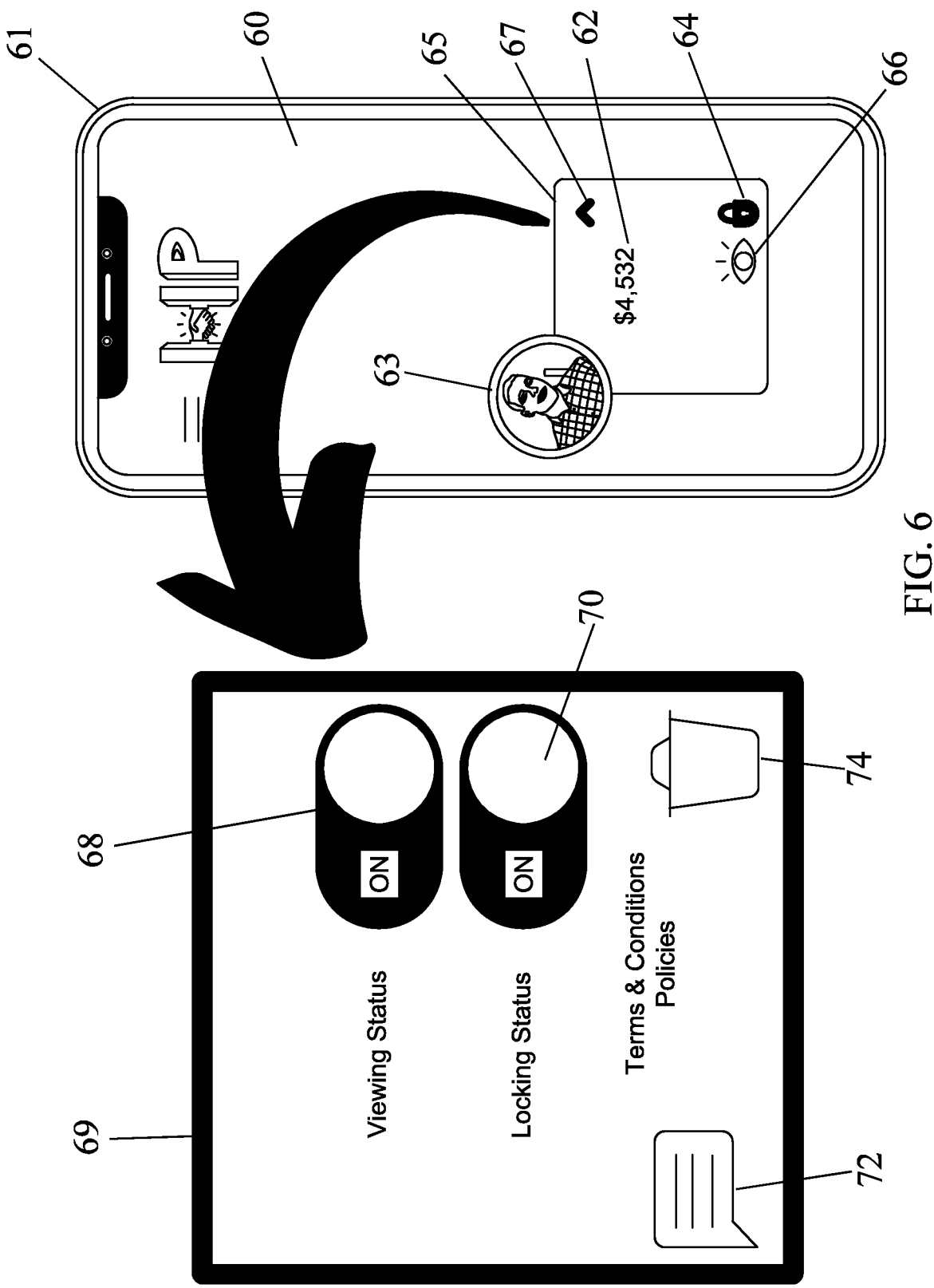
FIG. 6 illustrates, in an example embodiment, a graphical user interface (GUI) for a buyer, illustrating a viewing status and locking status selection.
Figure 7:
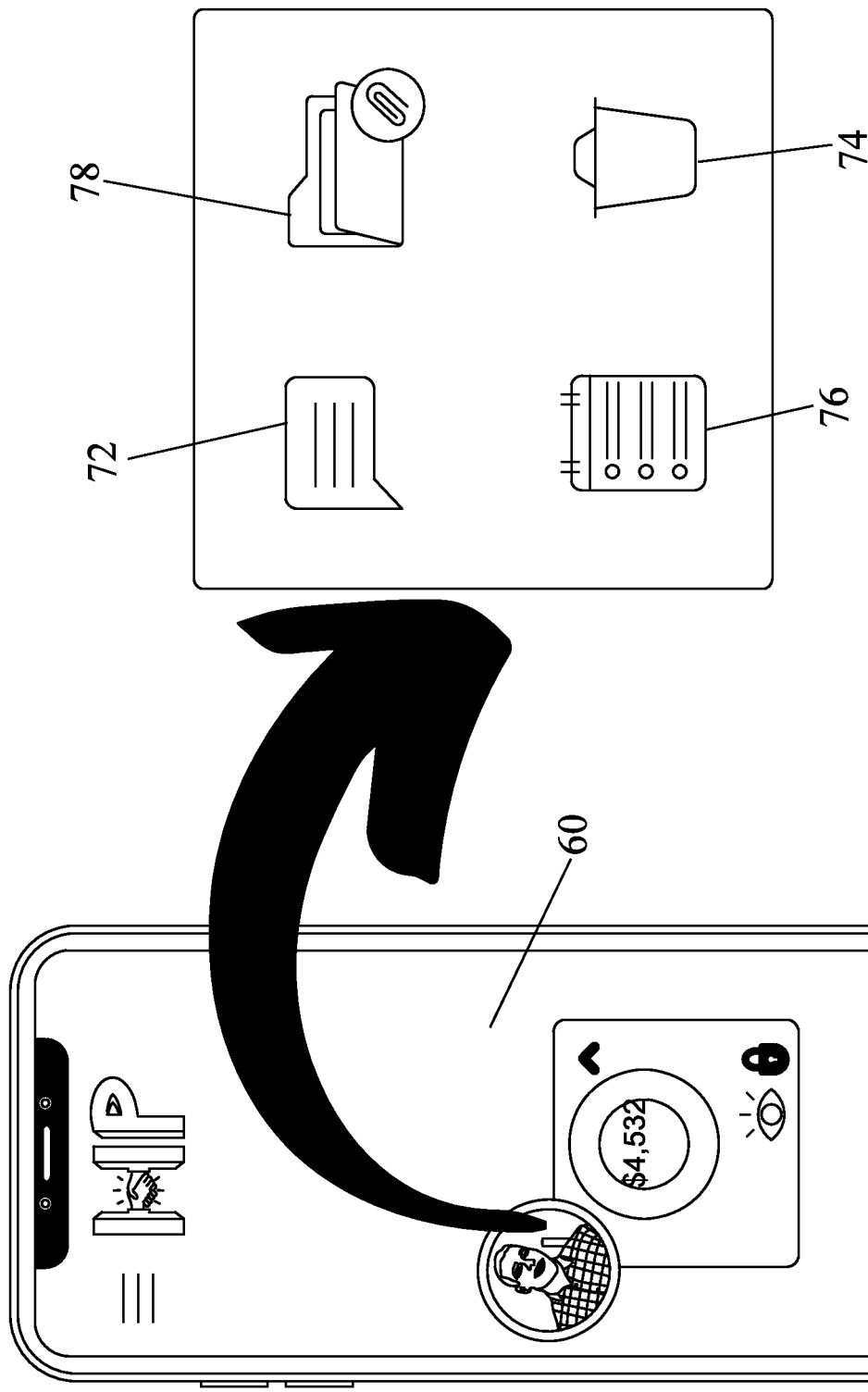
FIG. 7 illustrates, in an example embodiment, the GUI of FIG. 6, where the buyer can select additional menu options.

Referring now to FIGS. 6 and 7, a buyer, which, in this case may be a person looking to hire a contractor offering a service, such as an exterior staining service, can have a graphical user interface (GUI) 60 on an application on a computing device 61, as described above. The GUI 60 can include a buyer-created seller account 65. Clicking into the seller account may provide icons for adding comments 72, for removing the seller account (via a trash can 74, for example), for attaching files 78, such as work contracts, and for accessing a job checklist 76, for example, as shown in FIG. 7.

Figure 8C:
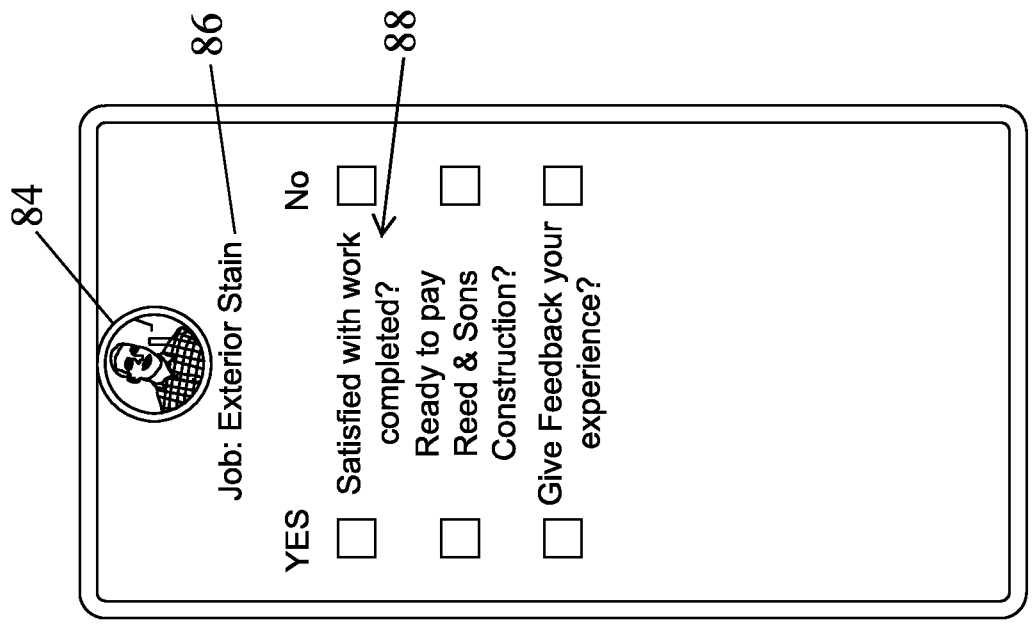
FIGS. 8A through 8C illustrate, in an example embodiment, a seller's GUI for viewing a job checklist to approve payment for a completed job.
Figure 8B:
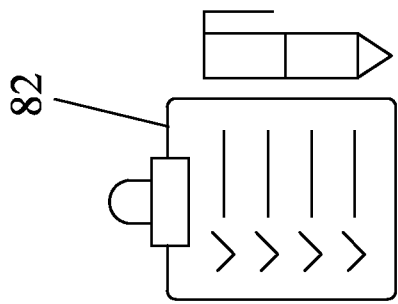
Figure 8A:
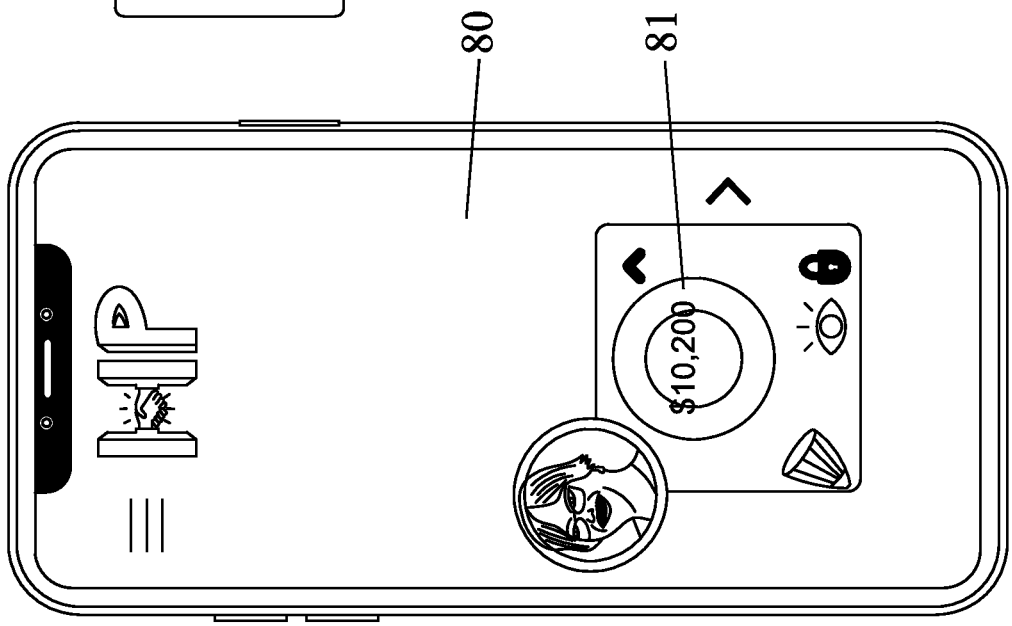

FIGS. 8A and 8C show a GUI 80 for a seller, including a home screen (FIG. 8A) and a job checklist screen (FIG. 8C), as described in greater detail below. When a user clicks into a seller account, there may be a checklist icon 82, as shown in FIG. 8B. The checklist 88, as shown in FIG. 8C may be provided to the buyer to indicate that the job was completed and payment should be made. The checklist 88 may show an icon 84 indicative of the seller, a job name 86, or the like.

Figure 9:
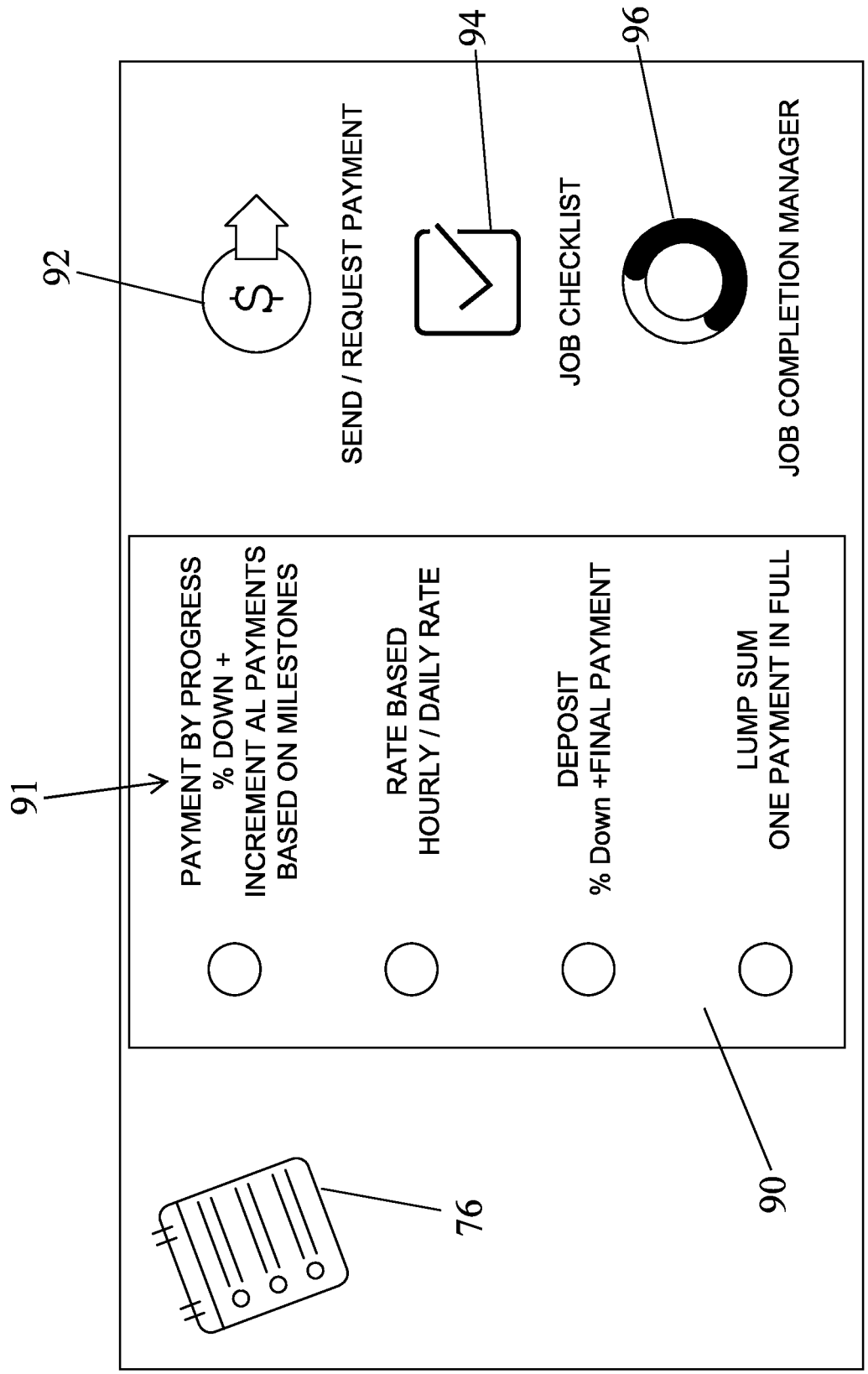
FIG. 9 illustrates, in an example embodiment, a GUI showing several options for arrangement payment for a job.

FIG. 9 shows a GUI 90 showing payment options and job setup options 91 in creating a job, for example, as described in greater detail below.

Figure 10:
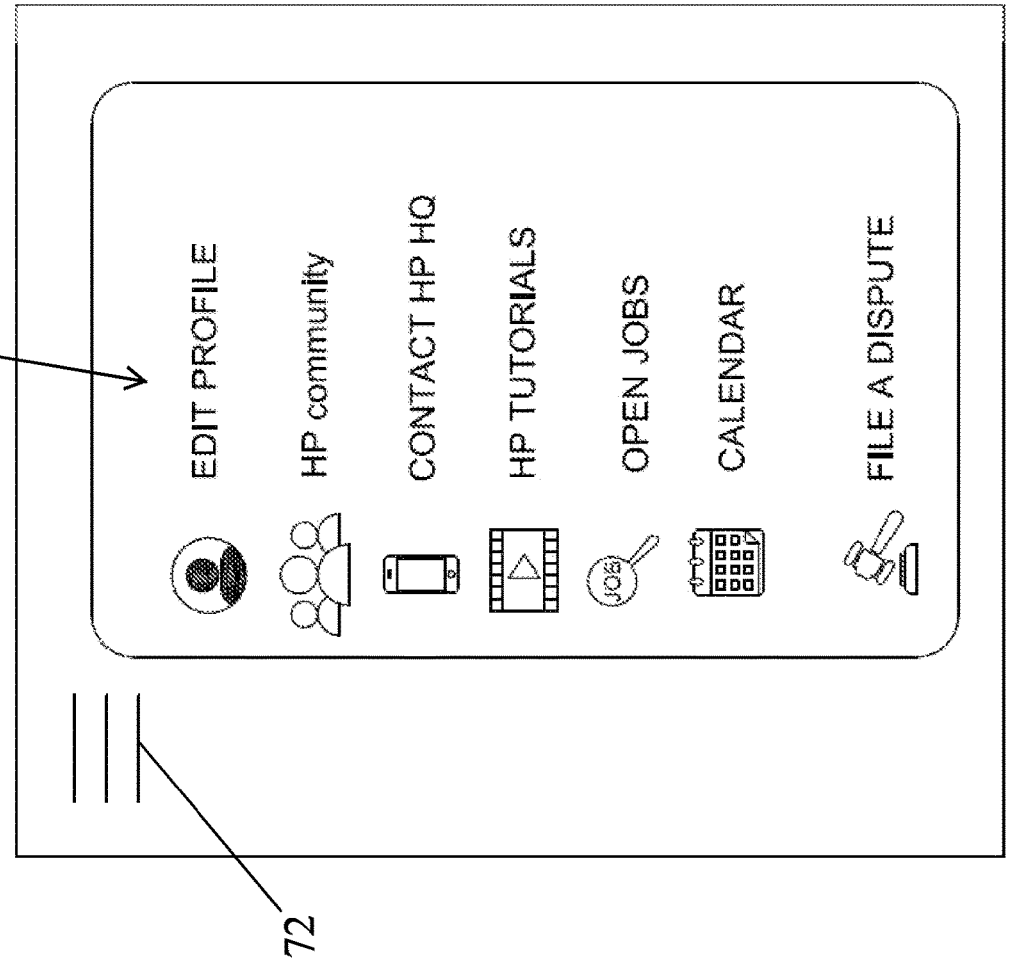
FIG. 10 illustrates, in an example embodiment, a GUI for selecting additional menu options for either a seller or a buyer.

FIG. 10 shows a GUI 98 of various menu options available to both sellers and buyers for setting up a profile, checking open jobs, viewing a calendar, filing a dispute, and the like.

The network application user can interact with a GUI, such as GUI 60 for a buyer, or GUI 80 for a seller, for example. The users can create an account and log-in to a unique personal account. The users can be given the option to transfer funds into a central account. For example, a user, such as a buyer looking to set up an exterior stain job, as shown in FIG. 6 can have a balance 62 shown on their GUI 60. Similarly, a seller (a contractor) may also have a GUI 80 showing a balance 81 shown in their account for a given job. The GUI 60 can also show the viewing status 66 and the locking status 64 as shown in FIG. 6. The user can connect with a financial institution or source of their choice to place funds into the central account. Options may include but are not limited to banks, digital payment platforms, credit cards and the like.

The amount of funds that was transferred into the central account can be displayed on the GUI 60, 80 for the account holder to privately view. The user will have the option to create a "seller account" (also referred to as a "holding account") as a secondary or sub-account of the central account. The user can connect with a separate account user by searching for them in a directory or entering a seller's unique account identifier, such as a QR code, user name, email address, or other form of identification. The connection between the users, both buyer and seller, is privately established within the network application to protect both users. For example, a buyer looking to contract an independent contractor, can try to look up the independent contractor in a directory in order to create a job, including job milestones, payment progress, or the like. In some embodiments, the independent contractor may have pre-established checklists for contracting a job, which then may be customized for a given buyer-seller connection.

When the user, who is the buyer in the agreement (such as a user seeking a contractor to accept a job), selects the option to move funds from the central account into a seller account, there is an option of the amount they would like to allocate into the seller account. A user may place funds in a seller account with or without a seller connected to the account. When there is a seller connected to the buyer's account, this is a unique buyer-seller relationship. When there is no seller connected to the buyer's account, the buyer may later connect a specific seller to the buyer-created "seller account" to which funds were previously allocated.

The funds allocated to the seller account will be subtracted from the central account and added to the seller account. This account is displayed to both users (the buyer and the seller) on their individual accounts with an icon, photograph, or name that distinguishes it from other seller accounts. At the time of the funds being allocated to the seller account, the amount of funds available is only viewable to the buyer on the buyer's GUI 60, as shown by balance 62. When a buyer is connected to this seller account, a designation of the buyer, such as an image 63, may be shown.

On the buyer's GUI 60, in the area of the unique seller account (in outline 65), an icon 67 such as an arrow, bullet, or other indicator for a menu option can be located within the outline 65 of the seller account, distinguished by a dark line or box surrounding the account information with the seller's name or unique identifier icon 63 within or touching the border, as shown in FIG. 6. The buyer can command the arrow icon and a prompt box can appear on the GUI 60. Within the graphic box 69 are the option regarding view status 68 and locking status 70. The graphic box 69 can include other options, such as a trash can 74 for deleting the seller account (which may only be available if a seller is not connected and/or the viewing status has not yet been turned on for the seller to see the seller account). A message icon 72 may be provided to permit the buyer and seller to contact each other via the system.

Viewing Status 68 can allow the seller, who is connected to the buyer's seller account, to see the funds available on their personal GUI (such as GUI 80) as it appears on the buyer's GUI 60. This indicates to the seller that there is proof of funds in the unique buyer/seller account. This is made visible to the seller when the buyer selects to "turn on" the viewing status of the account by moving a toggle switch, located adjacent to the words indicating "Viewing Status" from left to right. The invention is not limited to a toggle switch, but will be used for the purpose of demonstrating the application and may also use a button switch, check box, or other means. The Viewing Status 68 toggle switch will read "off" and will be green in color, for example. When the buyer user is ready to implement viewing status on the seller account, they may tap on or slide the Viewing Status 68 toggle switch to command it "on". At this time the user will be alerted to the significance of their action via a prompt on the GUI. The user can confirm the action by approving the prompt and choosing to proceed with turning Viewing Status 68 "on".

The toggle switch will turn from green to orange, for example, to indicate a change in the status. The seller user, when they are logged into their user account, can be notified that the buyer user has chosen to allow viewing status on the established buyer-seller account. The seller will be prompted on their personal GUI of the network application to accept or decline viewing status. The seller is responsible for accepting the invitation for viewing status to be turned on in order for the buyer's funds to be visible in the buyer/seller account. This does not give the seller access to removing the funds, it simply makes them viewable as a means of proof of fund availability.

When the seller user approves the viewing status the toggle switch on the buyer's user account, it can turn gray, for example, and will not be able to be turned off. The buyer still has the option to remove funds from the unique buyer/seller account, but all actions will be viewable by the seller. The seller will see the proof of funds as a monetary amount in the buyer/seller account.

The buyer user will also have the option to implement Locking Status 70 on their buyer/seller account. This will allow the buyer to not only display proof of funds, as with Viewing Status 68, it will inhibit the buyer's ability to remove funds from the buyer/seller account. The locked status is removed when the buyer/seller agreement is met, satisfied, dissolved, or resolved. The locked status, when enacted with the viewing status, can create a proof of funds understanding between the buyer and seller. The buyer's funds are available but not retrievable by buyer or seller until agreements are met, as described below.

The locked status 70 can have a similar system of turning "on" as with the viewing status, described above, using a toggle switch, check box, or button switch on the GUI 60. The Locked Status 70 can have a toggle switch adjacent to the words indicating "Locked Status" with the word "off" and the color green, for example. The buyer can command the toggle switch "on" by tapping or sliding on the GUI. The invention should not be limited to tapping or sliding the toggle switch on the GUI, other methods of changing the status may be speaking a command. A prompt can appear on the GUI to alert the buyer of the significance of the action and will give the user a choice to proceed or keep "Locked Status" "off".

The buyer may choose to proceed with implementing the "Locked Status". The Locked Status 70 toggle switch can move from left to right, will read "on", and will turn orange in color, for example. This "on" status is not permanent until the seller agrees to the change in status on the buyer/seller account, and therefore could be turned "off" prior to the seller's confirmation.

The seller user, when they are logged into their network application user account, will be notified that the buyer user has chosen to allow the "locked status" on the established buyer-seller account. The seller will be prompted on their personal GUI of the network application to accept or decline "locked status". The seller is responsible for accepting the invitation for locked status to be turned on in order for the buyer's funds to be locked in the buyer/seller account. This does not give the seller access to removing the funds, simply making them locked as a means of proof of fund availability.

When the seller user approves the locked status, the toggle switch on the buyer's user account will turn gray, for example, and will not be able to be turned off. Now, the buyer does not have the option to remove funds from the unique buyer/seller account. Icons on the seller's GUI will indicate "Viewing Status" and "Locked Status" on the funds in the buyer/seller account. For example, within the GUI where the buyer/seller account is outlined, the seller will see an icon of an eye indicating viewing status and an icon of a padlock indicating locked status. When the viewing status is "on" the icon of the eye can be displayed open and green, and when the viewing status is "off" the icon of an eye can have a diagonal slash through it and will be gray. When the locked status is "on" the padlock can appear as a closed lock and the color green, and when the locked status is "off" the icon of the padlock can appear as an open lock and gray.

These simple icons on the seller's GUI are helpful indicators that will clearly distinguish the status of the account, however they are not necessary to indicate status.

FIG. 9 illustrates a GUI 90 that may be provided to set up payment methods, milestone payments, hourly payments of the like. A selection 91 may be provided for options to set up the payment. Once set up, the milestones may appear similar to checklist 88 as shown in FIG. 8B. The GUI 90 may also include options for sending/requesting a payment 92, to access the job checklist 94 and to view a job completion manager 96. The GUI 90 may further permit editing and/or adding payments/payment milestones, should the job change during progress thereof. The selection 91 can include the payment disbursement options 205, as discussed above with reference to FIG. 5.

FIG. 10 shows various menu options 98 available if a user presses a menu button 72 on the GUI (such as GUI 60 or GUI 80). The menu options 98 can include those shown in FIG. 10, and may include different or other options.

The foregoing disclosure and illustrations of embodiments described herein are not intended to limit the present invention to the precise forms and terms used to detail the present invention. Embodiments are intended to provide a general understanding of the methods and possible applications to which they may be utilized. Terms such as "buyer", "seller", "agreements", "relationship", "online", and "network-based system" are examples applying to certain embodiments but are not intended to limit the accessibility of the invention through other technologies nor the persons to which the invention may serve.

Embodiments of the inventions described herein should allow persons of ordinary skill in the art to recognize that changes may be made in form and detail without departing from the scope of the invention. FIGS. 1-10 are merely representational and the elements, order of operations, and processes may be varied to suit particular applications. Part of some embodiments may be included in or substituted for those of other embodiments. Thus, the invention is limited only by the claims with each claim standing as its own embodiment. It will be evident that various modifications and changes may be made to these embodiments without departing from the broader scope and nature of embodiments as described in the claims.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A computer-implemented method for facilitating a transaction between a buyer and a seller, comprising:
   displaying a dashboard to the buyer in a buyer graphical user interface on a buyer computing device, the dashboard including a plurality of options providing for a selection and management of a central account of the buyer;
   creating a holding account associated with the central account, the holding account enabling the buyer to place funds therein from the central account;
   linking the holding account to the seller for which the buyer is making the transaction;
   providing a buyer viewing status identifier on the buyer graphical user interface, wherein turning on the viewing status identifier, by the buyer, permits the seller to view a presence of a holding account linking the buyer and the seller on a seller graphical user interface, the buyer viewing status identifier displaying with a first unique identification;

permitting the seller to access a seller viewing status identifier on the seller graphical user interface for the holding account, the seller viewing status identifier initially appearing in an off position with the first unique identification, wherein turning on the seller viewing status identifier changes the first unique identification to a second unique identification on both the seller viewing status identifier and the buyer viewing status identifier for the holding account; and permitting the buyer to accept a seller viewing status, wherein, upon acceptance, the second unique identification changes to a third unique identification on the buyer graphical user interface and on the seller graphical user interface, and a viewing status of the holding account is locked.

2. The computer-implemented method of claim 1, further comprising enabling, based on one or more disbursement parameters, a predefined amount of funds in the holding account to be transferred from the holding account to an account of the seller.

3. The computer-implemented method of claim 2, wherein the one or more disbursement parameters include receiving confirmation of completion of at least a portion of the transaction from the buyer on the buyer graphical user interface.

4. The computer-implemented method of claim 2, wherein the funds include one or more of assets, monies or a digital currency as established by a mutual agreement.

5. The computer-implemented method of claim 2, wherein the predetermined amount of funds include a full payment, a partial payment or an incremental payment based on a mutual agreement, wherein the transfer of the predetermined amount occurs without disrupting the locked viewing status.

6. The computer-implemented method of claim 2, wherein the transfer of funds from the holding account is performed without disrupting the locked viewing status.

7. The computer-implemented method of claim 1, further comprising:

providing a buyer locking status identifier on the buyer graphical user interface, wherein turning on the locking status identifier, by the displays the buyer locking status identifier with a first unique lock identification once turned on by the buyer;

permitting the seller, once turned on by the buyer, access to a seller locking status identifier on the seller graphical user interface for the holding account, the seller locking status identifier initially appearing in an off position with the first unique lock identification, wherein turning on the seller locking status identifier changes the first unique lock identification to a second unique lock identification on both the seller locking status identifier and the buyer locking status identifier for the holding account; and permitting the buyer to accept a seller locking status, wherein, upon acceptance, the second unique lock identification changes to a third unique lock identification on the buyer graphical user interface and on the seller graphical user interface, and an account balance in the holding account is locked.

8. The computer-implemented method of claim 7, further comprising enabling, based on one or more disbursement parameters, a predefined amount of funds in the holding account to be transferred from the holding account to an account of the seller.

9. The computer-implemented method of claim 8, wherein the predetermined amount of funds include a full payment, a partial payment or an incremental payment based on a mutual agreement, wherein the transfer of the predetermined amount occurs without disrupting the locked locking status.

10. The computer-implemented method of claim 8, wherein the transfer of funds from the holding account is performed without disrupting the locked viewing status.

11. The computer-implemented method of claim 8, wherein the one or more disbursement parameters are established by the buyer.

12. The computer-implemented method of claim 8, wherein the one or more disbursement parameters must be satisfied or dissolved in order for at least a portion of the account balance to be released from the holding account after the account balance is locked.

13. The computer-implemented method of claim 7, wherein fund withdrawal from the holding account by the buyer is not permitted once the account balance is locked.

14. The computer-implemented method of claim 1, further comprising modifying terms of the transaction and permitting additional or withdrawal of funds from the holding account based on the modified terms.

15. A computer-implemented method for facilitating a transaction between a buyer and a seller, comprising:

displaying a dashboard to the buyer in a buyer graphical user interface on a buyer computing device, the dashboard including a plurality of options providing for a selection and management of a central account of the buyer;

creating a holding account associated with the central account, the holding account enabling the buyer to place funds therein from the central account;

linking the holding account to the seller for which the buyer is making the transaction;

providing a buyer locking status identifier on the buyer graphical user interface, wherein turning on the locking status identifier, by the displays the buyer locking status identifier with a first unique lock identification once turned on by the buyer;

permitting the seller, once turned on by the buyer, access to a seller locking status identifier on the seller graphical user interface for the holding account, the seller locking status identifier initially appearing in an off position with the first unique lock identification, wherein turning on the seller locking status identifier changes the first unique lock identification to a second unique lock identification on both the seller locking status identifier and the buyer locking status identifier for the holding account; and permitting the buyer to accept a seller locking status, wherein, upon acceptance, the second unique lock identification changes to a third unique lock identification on the buyer graphical user interface and on the seller graphical user interface, and an account balance in the holding account is locked.

16. The computer-implemented method of claim 15, further comprising enabling, based on one or more disbursement parameters, a predefined amount of funds in the holding account to be transferred from the holding account to an account of the seller.

17. The computer-implemented method of claim 16, wherein the predetermined amount of funds include a full payment, a partial payment or an incremental payment based on a mutual agreement, wherein the transfer of the predetermined amount occurs without disrupting the locked locking status.

18. The computer-implemented method of claim 16, wherein the one or more disbursement parameters must be satisfied or dissolved in order for at least a portion of the account balance to be released from the holding account after the account balance is locked.

19. A computer-implemented method for facilitating a transaction between a buyer and a seller, comprising:
   displaying a dashboard to the buyer in a buyer graphical user interface on a buyer computing device, the dashboard including a plurality of options providing for a selection and management of a central account of the buyer;
   creating a holding account associated with the central account, the holding account enabling the buyer to place funds therein from the central account;
   linking the holding account to the seller for which the buyer is making the transaction;
   providing a buyer viewing status identifier on the buyer graphical user interface, wherein turning on the viewing status identifier, by the buyer, permits the seller to view a presence of a holding account linking the buyer and the seller on a seller graphical user interface, the buyer viewing status identifier displaying with a first unique identification;
   permitting the seller to access a seller viewing status identifier on the seller graphical user interface for the holding account, the seller viewing status identifier initially appearing in an off position with the first unique identification, wherein turning on the seller viewing status identifier changes the first unique identification to a second unique identification on both the seller viewing status identifier and the buyer viewing status identifier for the holding account;
   permitting the buyer to accept a seller viewing status, wherein, upon acceptance, the second unique identification changes to a third unique identification on the buyer graphical user interface and on the seller graphical user interface, and a viewing status of the holding account is locked;
   providing a buyer locking status identifier on the buyer graphical user interface, wherein turning on the locking status identifier, by the displays the buyer locking status identifier with a first unique lock identification once turned on by the buyer;
   permitting the seller, once turned on by the buyer, access to a seller locking status identifier on the seller graphical user interface for the holding account, the seller locking status identifier initially appearing in an off position with the first unique lock identification, wherein turning on the seller locking status identifier changes the first unique lock identification to a second unique lock identification on both the seller locking status identifier and the buyer locking status identifier for the holding account;
   permitting the buyer to accept a seller locking status, wherein, upon acceptance, the second unique lock identification changes to a third unique lock identification on the buyer graphical user interface and on the seller graphical user interface, and an account balance in the holding account is locked; and
   enabling, based on one or more disbursement parameters, a predefined amount of funds in the holding account to be transferred from the holding account to an account of the seller.

\* \* \* \* \*